United States Patent [19]

Heggenstaller

[11] 4,385,564

[45] May 31, 1983

[54] PALLET AND METHOD OF MAKING SAME

[76] Inventor: Anton Heggenstaller, Mühlenstrasse 9, D-8891 Unterbernbach, Fed. Rep. of Germany

[21] Appl. No.: 219,859

[22] Filed: Dec. 23, 1980

[30] Foreign Application Priority Data

Sep. 22, 1980 [DE] Fed. Rep. of Germany ....... 3035701

[51] Int. Cl.[3] ........................ B65D 19/14; D04H 1/20; B29C 17/00

[52] U.S. Cl. .................................. 108/51.1; 108/57.1; 108/901; 264/112; 264/151

[58] Field of Search ............ 108/51.1, 53.3, 55.1–57.1, 108/901; 264/112, 113, 120, 122, 151; 206/386, 599, 600

[56] References Cited

U.S. PATENT DOCUMENTS

| | | | |
|---|---|---|---|
| 3,028,287 | 4/1962 | Greten | 264/122 X |
| 3,104,085 | 9/1963 | Skladany | 108/51.1 X |
| 3,342,146 | 9/1967 | Lessheim | 108/56.1 X |
| 3,454,694 | 7/1969 | Delaire et al. | 264/151 |
| 3,846,219 | 11/1974 | Kunz | 264/113 X |
| 4,061,813 | 12/1974 | Geimer et al. | 108/51.1 X |
| 4,078,030 | 3/1978 | Munk et al. | 264/122 X |
| 4,213,928 | 7/1980 | Casselbrant | 264/113 |
| 4,303,019 | 12/1981 | Haataja et al. | 108/51.1 |
| 4,315,722 | 2/1982 | Ufermann | 264/113 |

FOREIGN PATENT DOCUMENTS

| | | | |
|---|---|---|---|
| 2301441 | 9/1976 | France | 108/56.1 |

*Primary Examiner*—William E. Lyddane
*Attorney, Agent, or Firm*—Karl F. Ross; Herbert Dubno

[57] ABSTRACT

A pallet has at least one board secured to a plurality of like elongated parallel stiffening ribs having flat upper sides secured to the board and lower sides formed with downwardly projecting and longitudinally spaced bumps. These ribs are each formed by filling into an upwardly open elongated mold of generally regular cross section a mass of coarse and fine particles and a binder in such a manner that the fine particles are concentrated in the lower portion of the mass and the coarse particles are concentrated in the upper portion of the mass. The mass is then compressed downwardly in the mold to a relatively great extent at several longitudinally spaced-apart locations and to a lesser extent therebetween to form upwardly projecting bumps or feet between these locations. The thus compressed mass is cured into a stiffening rib which is inverted and has the board secured to its planar upper surface opposite its feet.

10 Claims, 8 Drawing Figures

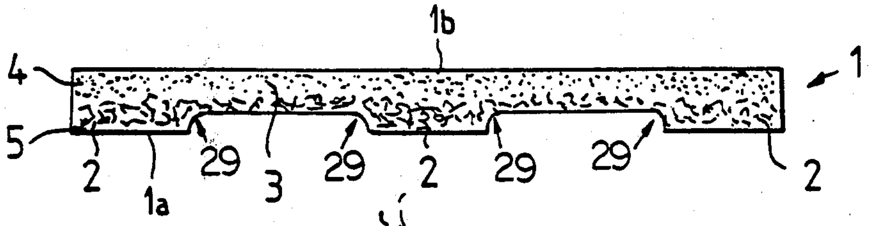
FIG.1
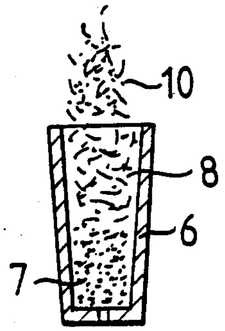
FIG.2
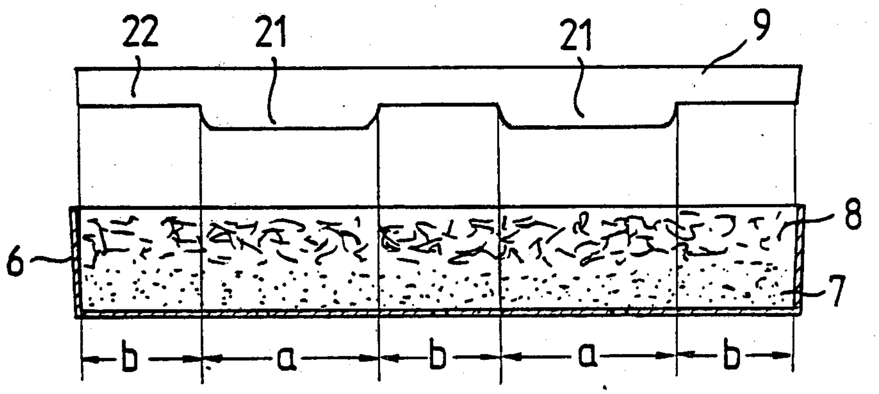
FIG.3
FIG.4
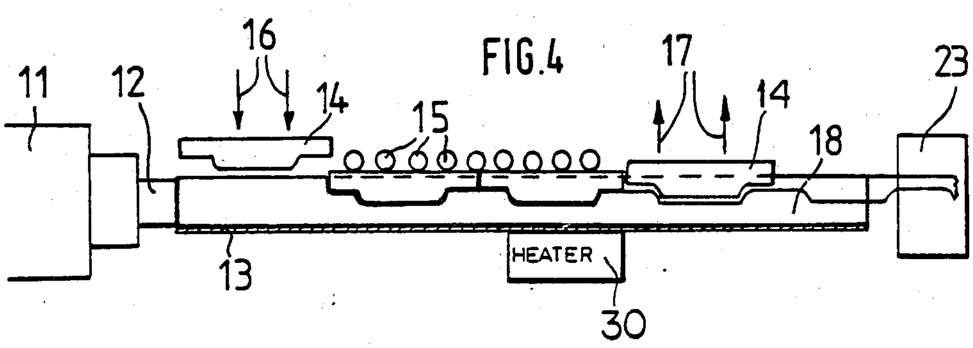

FIG.5
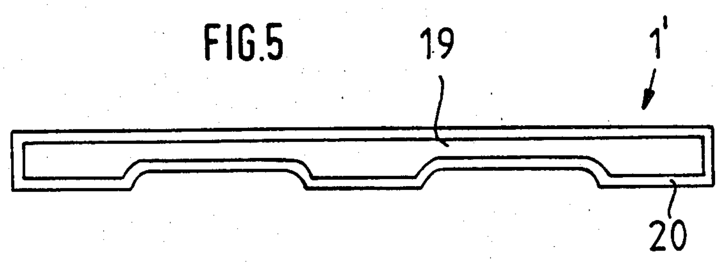
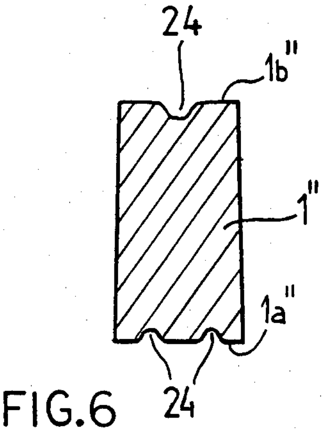
FIG.6
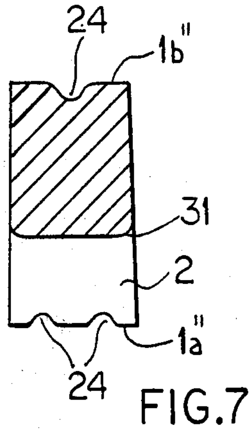
FIG.7
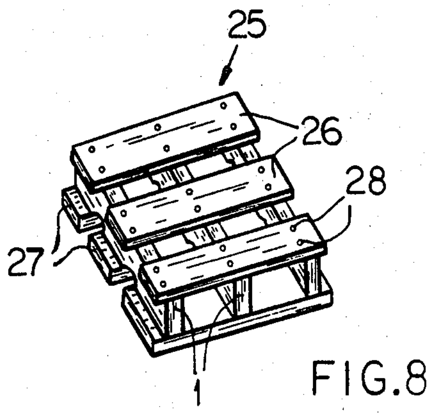
FIG.8

PALLET AND METHOD OF MAKING SAME

FIELD OF THE INVENTION

The present invention relates to a storage or shipping pallet and method of making same. More particularly this invention concerns such a pallet having reinforcing ribs of compressed particle construction.

BACKGROUND OF THE INVENTION

A standard shipping pallet comprises a plurality of coplanar boards secured to the upper edges of a plurality of transverse stiffening ribs. Normally three stiffening ribs are provided to form two openings extending parallel to the stiffening ribs for the tines of a fork lift. In order that the fork lift can also operate transversely it is also standard practice to form these stiffening ribs with three equispaced downwardly projecting feet forming two further openings or passages extending transversely to the stiffening ribs and parallel to the boards secured to their upper surfaces. It is also standard practice to nail further boards across these feet on the lower surface parallel to the upper boards so that the pallet is quite strong and can stand on relatively uneven ground. Rather than using a plurality of parallel coplanar boards on the top and bottom it is also, of course, possible to use a single very wide board or piece of plywood.

It is known to form such a stiffening rib of particles, for instance by a method such as described in my copending application Ser. No. 176,004 filed Aug. 17, 1980. This application describes a method of and apparatus for the cold extrusion of a mixture of plant particles and a binder, especially for the production of load-bearing beams and similarly shaped bodies in which the plant particles are wood chips or the like. A plunger ram displaces the mixture piston-fashion into the extrusion passages in which hardening can occur under conditions such that the material flows during compaction and is compressed with a densification ratio of 2:1 to 4:1. The resultant beam is relatively strong, inexpensive to manufacture, and has excellent dimensional stability.

The main problem with a pallet so constructed, which is described in German patent publication No. 2,508,493 filed Feb. 27, 1975 by H. Lewin, is that the stiffening ribs when bent frequently fracture adjacent the feet, that is at the corner between the upright portion of the side of the foot and horizontal portion of the stiffening ribs between the feet. Fracture at this point is particularly disadvantageous because it lies between the upper and lower boards and, therefore, allows the pallet to come apart.

OBJECTS OF THE INVENTION

It is therefore an object of the present invention to provide an improved pallet and method of making same.

Another object is to provide an improved pallet construction using a particle composition reinforcing rib which overcomes the above-given disadvantage.

SUMMARY OF THE INVENTION

These objects are attained according to the instant invention in a pallet of the above-described general type but wherein the ribs are each made of a compressed mass of bound-together coarse and fine particles with the coarse particles concentrated toward the upper side of the rib and the fine particles concentrated toward the lower side of the rib having the bumps. The mass, furthermore, is compressed more between the bumps than at the bumps.

Such a stiffening rib is made according to the instant invention by filling into an upwardly open mold of generally regular cross section a mass of coarse and fine particles and a binder in such a manner that the fine particles are concentrated in the lower portion of the mass and the coarse particles are concentrated in the upper portion of the mass. The mass is then compressed downward in the mold to a relatively great extent at several, normally two, longitudinally spaced-apart locations and to a lesser extent therebetween to form upwardly projecting feet-forming bumps between these locations. This compressed mass is then cured into a stiffening rib and is secured to at least one board as described above.

Normally the stratification between the fine and coarse particles as described above can simply be achieved by dropping the particles some distance through the air into the mold. This type of filling automatically stratifies the layers as described above, producing a mass with the fine particles underneath and the large particles on top. Vibrating the filled mold will have a similar effect, causing the fine particles to filter through to the bottom. The fine particles according to this invention are basically granular whereas the coarse particles are normally elongated, such as shavings produced during woodworking operations.

The above-described operation can be carried out simply by pouring the mixture of coarse and fine particles with their binder, mixed in accordance with the procedures described in my above-cited copending application, into the mold, and then scraping off everything that projects above the planar upper edge of the mold. A plug having a shape complementary to the desired form of the bottom of the pallet is then pressed down into this mold which preferably tapers downward for easiest demolding of the finished workpiece.

It is also possible according to this invention to extrude the mass longitudinally into a U-section channel stepwise, also in accordance with the cold-pressing method described in my above-cited patent but with substantially less densification. The strand extruded into the channel is pressed downward by plug sections that are pressed downward into the strand between advanced steps and that thereafter move downstream with the strand as it is advanced. Meanwhile the mass is heated so as to cure the normally thermosetting resin and at the downstream end of the shaping channel or mold the plug sections are withdrawn upward for recirculation back to the upstream end and reuse. As usual the stiffening rib is produced upside down from the position it is used in.

Forming the thus molded stiffening rib with longitudinal grooves on its upper and lower side as well as depressions on its side flanks further increases its strength.

The stiffening rib according to the instant invention is extremely strong since the upper region which is subject mainly to compression is comprised mainly of small particles which can easily withstand such compression. The larger particles, which unlike the small particles have greater resistance to tension and bending stresses, are provided in the lower region where such stresses are normally encountered. Furthermore since the mass forming the stiffening ribs is compressed more greatly between the feet than at the feet, likelihood of breakage at the edges of the feet is greatly decreased. Indeed when stressed greatly it is found according to this invention that breaking does not occur radially of the rounded corner provided adjacent each foot, but instead parallel to it. Such a crack does not cause the pallet to come apart, and in fact it does not significantly weaken the pallet under most circumstances.

BRIEF DESCRIPTION OF THE DRAWING

FIG. 1 is a side view of a stiffening rib of a pallet according to this invention;

FIG. 2 is a cross section through a mold being filled according to this invention;

FIG. 3 is a longitudinal section through the molding apparatus for carrying out the method of this invention;

FIG. 4 is a side largely schematic view showing another apparatus for carrying out the method of this invention;

FIG. 5 is a side view in small scale of a stiffening rib according to this invention;

FIGS. 6 and 7 are cross sections through another stiffening rib according to this invention; and FIG. 8 is a perspective view of a pallet having a stiffening ribs according to this invention.

SPECIFIC DESCRIPTION

As best as seen in FIG. 8 a pallet 25 according to the instant invention is basically formed by a plurality of upper boards 26 and, parallel thereto, a plurality of lower boards 27 together sandwiching a plurality of rectangular-section stiffening ribs 1. Nails 28 secure the boards or planks 26, 27 to the upper and lower surfaces of the stiffening ribs 1.

FIG. 1 shows a stiffening rib 1 in more detail. It has a plurality of feet 2 forming a planar lower surface 1*a* parallel to an upper surface 1*b* of the stiffening rib. The upper region 4 of this stiffening rib 1 is formed of relatively fine particles 7 and the lower region 5 is formed of relatively coarse particles 8.

The regions 3 between adjacent feet are substantially more compressed than the regions at the feet. The corners 29 between the feet and the regions 3 are rounded.

FIGS. 2 and 3 show how such a stiffening rib 1 according to the instant invention is made. A mass 10 of particles 7 and 8 along with a suitable binder of the type described in my above-cited copending application is filled into an upwardly open and downwardly tapering mold 6. Normally dropping the mixture 10 causes the fibers to segregate with the coarse fibers 8 above the fine fibers 7. Vibrating the mold 6 further intensifies this stratification.

A plug 9 having thick regions 21 and thin regions 22 is then pressed down into the mold 6 so as to compress the mass greatly at regions a corresponding to the regions 3 and to leave it less compressed at regions b corresponding to the feet 2. The mold 6 and its contents may be heated while the plug 9 is held in place until the binder cures. Then the plug 9 is retracted and the mold 6 inverted to knock out the rib 1 thus formed.

FIG. 4 shows how it is also possible to use a cold-press extruder 11 which extrudes a strand 12 into a U-section shaping channel 13. Such an extruder 11, as described in my above-cited copending application, produces the strand 12 stepwise. Between advance steps plug sections 14 are pressed downwardly in direction 16 into the strand 12. As the strand 12 advances these sections 14 move under rollers 15 which hold them down in the channel 13 which may be provided with a heater 30. As the strand 12 therefore moves downstream with the sections 14 closely longitudinally abutting one another it is converted into a strand 18 having the desired shape.

Downstream of the rollers 15 the sections 14 are pulled upwardly in direction 17 out of engagement with the cured strand 18 and are recirculated back to the upstream end for reuse. After the strand 18 emerges from the mold channel 13 it is cut up into appropriate lengths at a sawing station 23.

It is also possible as shown in FIG. 4 to form a stiffening rib 1' with lateral depressions 19 on its side flanks defining a raised bead or edge 20 all around the rib 1'.

In addition FIGS. 6 and 7 show how the bottom and top surfaces 1*a*'' and 1*b*'' of a rib 1'' can be formed with longitudinally extending grooves 24, one in the top and two in the bottom. Such grooves further increases the strength of the assembly. FIG. 7 also shows how the edges 31 adjacent the feet 3 can be beveled.

Thus the system according to the instant invention allows a stiffening rib to be produced which has substantially more strength than any of the prior-art stiffening ribs. In fact the strength is substantially greater than that of a standard and substantially more expensive oak stiffening rib. At the same time the dimensional stability of the stiffening rib will be considerable so that the pallet embodying it will be very strong.

I claim:

1. A method of making a pallet comprising the steps of sequentially:
   - filling into an upwardly open elongated mold of generally regular cross section a mass of coarse and fine particles and a binder in such a manner that said fine particles are concentrated in the lower portion of said mass and said coarse particles are concentrated in the upper portion of said mass;
   - compressing said mass of particles downwardly in said mold to a relatively great extent at several longitudinally spaced-apart locations and to a lesser extent therebetween to form upwardly projecting bumps between said locations;
   - curing the thus compressed mass into a stiffening rib; and
   - securing at least one board to a plurality of such ribs arranged parallel to one other.

2. The method defined in claim 1 wherein said board is secured to the sides of said ribs opposite said bumps.

3. The method defined in claim 1 wherein said mass is compressed by being pushed downwardly in said mold by a plug having projecting portions that engage between said locations.

4. The method defined in claim 3 wherein said mass is advanced step-wise longitudinally along said mold and said plug is pressed down into said mass between advance steps and thereafter advances with said mass to the downstream end of said mold.

5. The method defined in claim 4 wherein said plug has a plurality of separate pieces which are sequentially pressed down into said mass at the upstream end of said mold and which are pulled upwardly out of said mass at the downstream of said mass at the downstream end of said mold and then recirculated to said upstream end.

6. A pallet comprising:
   - at least one board; and
   - a plurality of like elongated stiffening ribs having flat upper sides secured to said board and lower sides formed with downwardly projecting and longitudinally spaced bumps, said ribs each being formed of a compressed mass of bound-together coarse and fine particles with said coarse particles concentrated toward the respective upper side and said fine particles concentrated toward the respective lower side and bumps, said masses each being compressed more between said bumps than at said bumps.

7. The pallet defined in claim 6 wherein each of said ribs is formed along at least one of said sides with a longitudinally extending groove.

8. The pallet defined in claim 6, further comprising another such board secured to said lower side at said bumps.

9. The pallet defined in claim 6 wherein each of said ribs has a pair of longitudinal side faces each formed with a longitudinally extending full-length depression.

10. The pallet defined in claim 6 wherein each of said ribs has a pair of longitudinal side faces forming with said lower side a pair of lower edges, said lower edges being rounded.

* * * * *